June 21, 1927.                H. E. EBMEIER                1,633,365
                              SEED CORN SHELLER
                              Filed Feb. 21, 1927
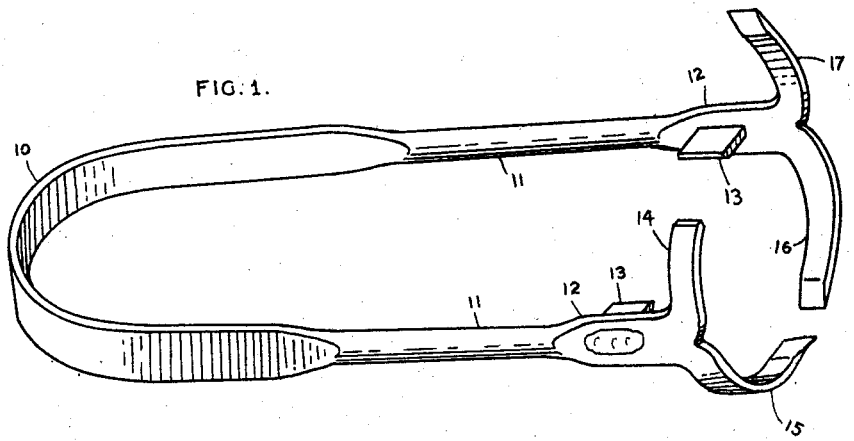
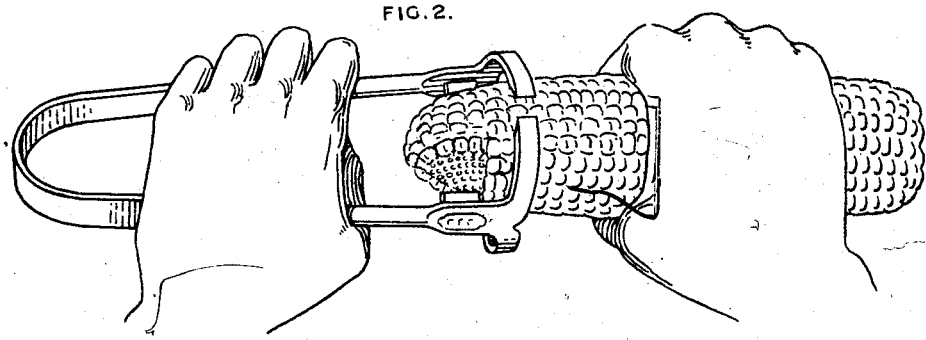
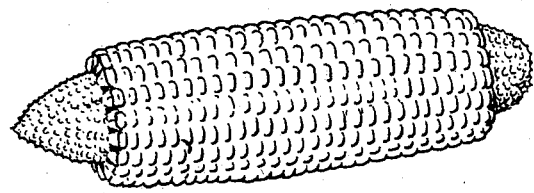
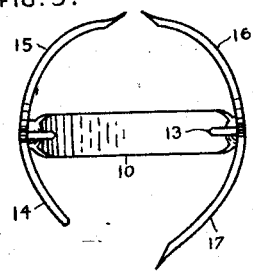
H. E. Ebmeier Inventor
Emil F. Lange Attorney Patented June 21, 1927.

1,633,365

UNITED STATES PATENT OFFICE.

HARRY E. EBMEIER, OF BERTRAND, NEBRASKA.

SEED-CORN SHELLER.

Application filed February 21, 1927. Serial No. 170,067.

My invention relates to devices for stripping or otherwise removing objectionable kernels from ears of seed corn and its object is the provision of a hand operated tool of extreme simplicity of construction and operation, the tool being designed to strip the kernels from the butt and tip of the ear and to remove defective kernels in the body of the ear.

Having in view these objects and others which will be pointed out in the following description, I will now refer to the drawings, in which Figure 1 is a view in perspective of the corn sheller.

Figure 2 is an illustration showing the use of the corn sheller.

Figure 3 is an end view of the corn sheller.

Figure 4 is an illustration of an ear of corn with the kernels stripped from the butt and tip by the use of my corn sheller.

The device is preferably made from an iron rod of suitable diameter by flattening the middle and end portions and by then bending the entire device into U form and bifurcating the flattened end portions, after which a stripping tooth is inserted in each half of the device.

The device thus consists of a flattened U-shaped portion 10, of the round portions 11 and of flattened end portions 12 having inserted teeth 13 and terminating in curved portions 14, 15, 16 and 17. The teeth 13 are preferably driven through suitable apertures in the flattened portions 12 and are riveted thereto but they may be secured in any other desired manner. At their inner ends the teeth 13 are wedge shaped, each having a blunt inner edge.

In use, the device is held in one hand in the manner indicated in Figure 2 with an ear of corn embraced by the portions 14, 15, 16 and 17. By then twisting the device about the ear or by turning the ear in the device the teeth 13 readily strip off the kernels, leaving the ear in the condition shown in Figure 4. During the stripping the device is, of course, compressed so as to bring the teeth 13 into engagement with the kernels, the degree of compression depending on the diameter of the ear at the portion to be stripped.

Ears of seed corn frequently have individual grains which are worm-eaten or moldy or which are defective from other causes. The device as shown in Figure 1 is designed to serve as a tool for removing such defective kernels from the ear. The portion 17 is somewhat outturned and it is beveled at its outer end so that it serves as a pick for removing any individual kernel on the ear. The portions 15 and 16 are also outturned but to a less degree than the portion 17 and they are also beveled at their outer ends. When the two halves of the device are brought toward each other, the ends of the portions 15 and 16 will meet to serve as pinchers. The kernel may be grasped between the ends of the portions 15 and 16 and extracted from the ear without disturbing other kernels.

The material possesses sufficient resiliency when flattened at 10 to make the tool convenient and very easy to use. The defective kernels are quickly removed from the ear, leaving only those kernels which pass readily through the seed dropping mechanism of the planter. These kernels may then be removed, prior to planting, by running the ears through a corn sheller while the discarded kernels may be fed to live stock. The tool is also useful in supplementing the work of hand operated corn shellers which often leave more or less corn on the cob. Before the cobs are used as fuel, they may be gone over with the tool above described to remove such kernels. This may be done during leisure moments during the winter, and the corn which is recovered from the cob pile may be fed to the live stock at a clear gain.

Having thus described my invention in such full, clear, and exact terms that its construction and operation will be readily understood by others skilled in the art to which it pertains, what I claim as new and desire to secure by Letters Patent of the United States is:

1. A device for stripping grains from ears of corn, said device including a U-shaped resilient handle portion, a single stripping tooth on each arm of said U-shaped portion, and arcuate portions projecting from the free extremities of said U-shaped portion, said arcuate portions being adapted to embrace the ear of corn.

2. A device for stripping grains from ears of corn, said device including a U-shaped resilient handle portion, each arm of said U-shaped portion terminating in a pair of arcuate members, said arcuate members being adapted to embrace an ear of corn, and a stripping tooth on each arm of said U-shaped portion, said stripping teeth being adapted to engage the grains of corn when said U-shaped portion is compressed with said arcuate members embracing the ear of corn.

3. A device for stripping grains from ears of corn, said device including a U-shaped resilient handle member, each arm of said U-shaped member terminating in a pair of arcuate members, said arcuate members being integral with said U-shaped member and angularly disposed thereto whereby they are adapted to embrace the ear of corn, and a stripping tooth on each arm of said U-shaped member adjacent said arcuate members, said stripping teeth being adapted to engage the grains of corn when said U-shaped member is compressed with said arcuate members embracing the ear of corn.

In testimony whereof I affix my signature.

HARRY E. EBMEIER.